Oct. 20, 1970 C. W. HANKS 3,535,428
APPARATUS FOR PRODUCING AND DIRECTING AN ELECTRON BEAM
Filed July 17, 1968 3 Sheets-Sheet 1
FIG. 1.
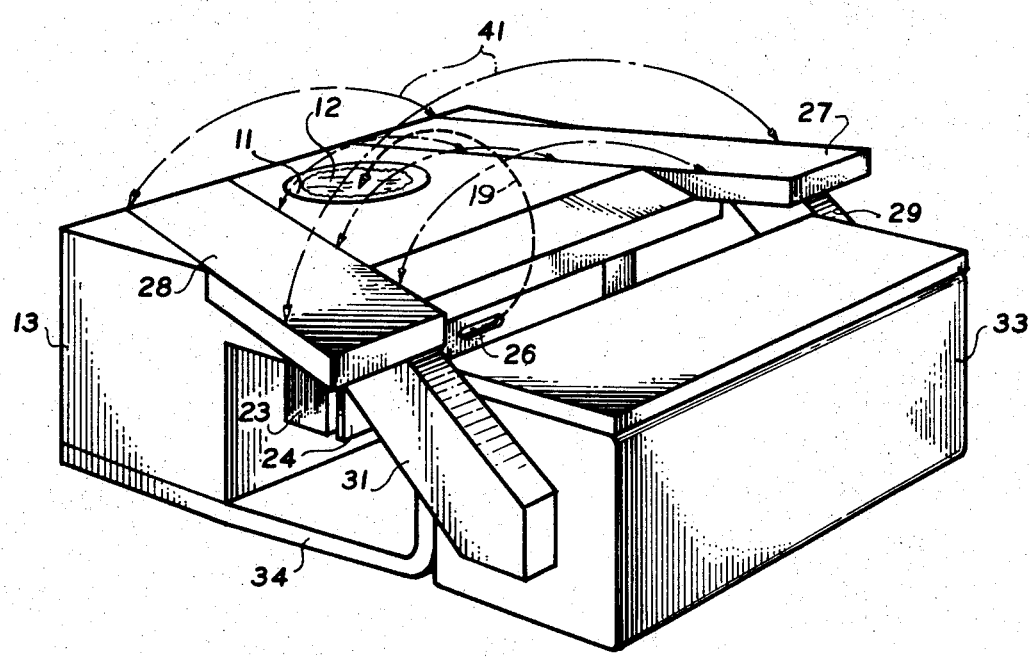
FIG. 4.    FIG. 5.    FIG. 6    FIG. 7.
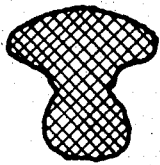  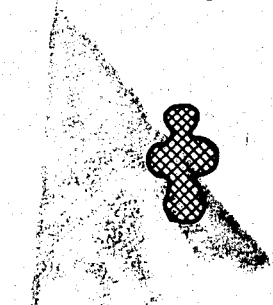 
INVENTOR.
CHARLES W. HANKS
BY Anderson, Luedeka, Fitch,
Even & Tabin
ATTORNEYS Oct. 20, 1970 — C. W. HANKS — 3,535,428
APPARATUS FOR PRODUCING AND DIRECTING AN ELECTRON BEAM
Filed July 17, 1968 — 3 Sheets-Sheet 2

INVENTOR.
CHARLES W. HANKS

Oct. 20, 1970    C. W. HANKS    3,535,428
APPARATUS FOR PRODUCING AND DIRECTING AN ELECTRON BEAM
Filed July 17, 1968    3 Sheets-Sheet 3
FIG. 9.
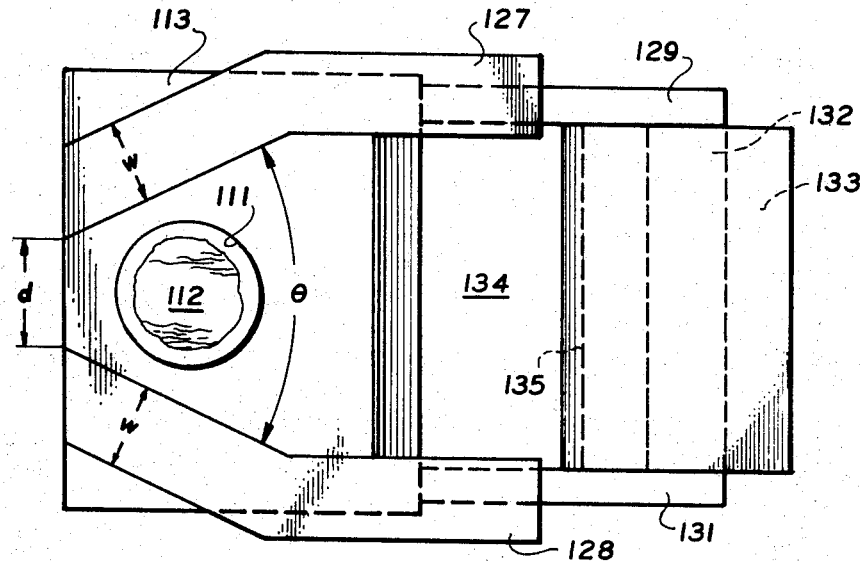
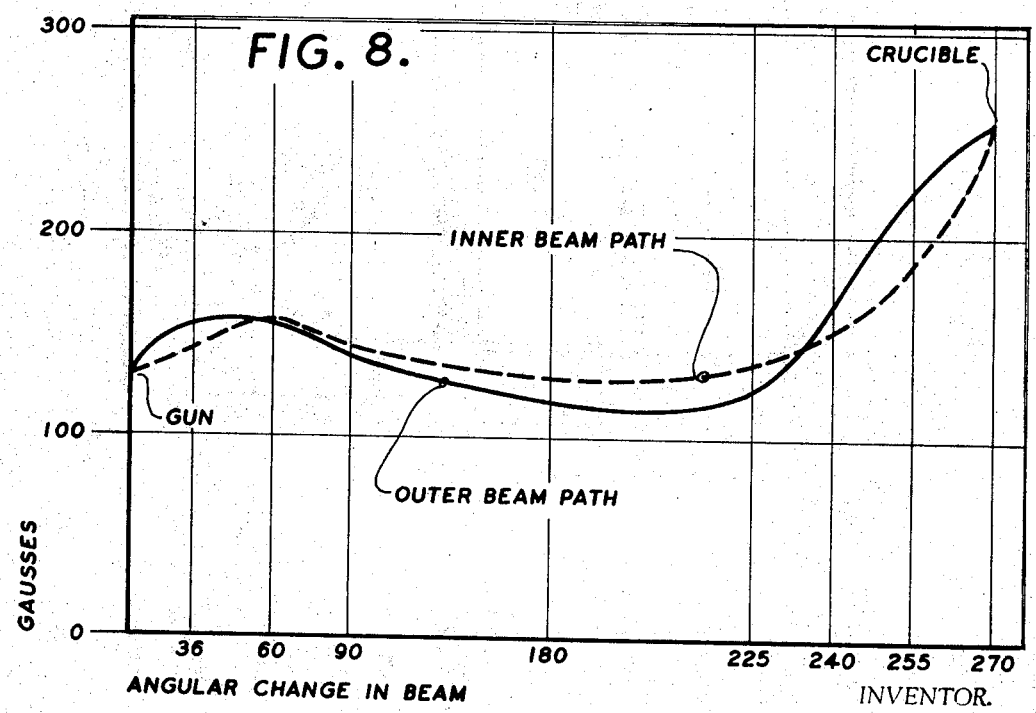
INVENTOR.
CHARLES W. HANKS
BY
ATTORNEYS

United States Patent Office 3,535,428
Patented Oct. 20, 1970

3,535,428
APPARATUS FOR PRODUCING AND DIRECTING AN ELECTRON BEAM
Charles W. Hanks, Orinda, Calif., assignor to Air Reduction Company, Incorporated, New York, N.Y., a corporation of New York
Filed July 17, 1968, Ser. No. 745,509
Int. Cl. H01f 7/00
U.S. Cl. 13—9                                                     11 Claims

ABSTRACT OF THE DISCLOSURE

Apparatus is described for producing an electron beam and for deflecting the beam through an arcuate path by a transverse magnetic field. The field near the target surface increases in strength in the plane of the curving path from the inner edge of the beam toward the outer edge. The field has an average strength near the target which is about twice the average strength of the field in the region near the middle of the beam path and has lines of flux which are concave with respect to the target surface.

---

This invention relates to apparatus for producing and directing an electron beam and, more particularly, to improved apparatus for producing an electron beam, and directing it through a change in direction while focusing such electron beam onto a desired impact area on the surface of a target.

Electron beam furnace systems utilize one or more electron beam gun assemblies for producing high energy electron beams and directing them to a target for heating the target. Electron beam gun assemblies generally comprise an electron emissive filament for emitting electrons, and suitable means for focusing the electrons into a beam. The beam of electrons is accelerated along an initial path by a suitable accelerating anode. Magnetic fields may be provided to direct the electron beam through a desired path onto the surface of a target in the furnace and to focus the beam to a desired concentration and thereby control the size of the impact area on the surface of the target.

One type of electron beam gun assembly of particular advantage utilizes magnetic fields extending transverse to the direction of travel of the electrons in the beam to deflect the beam of electrons through a curving path onto the target. Deflection of the electron beam by transverse fields enables the electron emissive filament to be positioned out of a line of sight of the target. Thus the filament is not directly exposed to materials vaporized from the target, and evolved condensible materials do not readily condense on the surfaces of the filament. A substantial decrease in erosion of the electron emissive filament and a resulting longer life of the filament is achieved. Moreover, the tendency for negative ions and secondary electrons to be trapped in the electron beam is substantially reduced by the use of transverse fields. This reduces space charge buildup which can detrimetally affect focusing and deflection. A successful electron beam gun assembly of this type is shown and described in U.S. Pat. No. 3,177,535.

As shown in the cited patent, one use of electron beams deflected by transverse magnetic fields is in connection with the melting of material in an upright crucible. Under some circumstances, spalling of condensed materials from cooled surfaces of the vacuum enclosure, and splashing and splattering of molten material from an upright crucible, constitute a potential impairment to satisfactory operation of an electron beam gun as described in the cited patent. However, by positioning the electron emissive filament underneath the crucible and by deflecting the electron beam through a curving path of approximately 270°, the electron emissive filament is protected from splashing, splattering and spalling and it is unnecessary to utilize shields or similar devices.

In addition to deflecting the beam through a curving path of greater than 180°, it may be of advantage to focus the electron beam so that the beam converges in a desired impact area on the target surface. By causing convergence of the beam into a generally round spot of a desired size on the surface of the target, close regulation may be made of the heat transferred to the surface of the target, and the thermal pattern of the target. Heretofore, however, 270° deflecion systems have utilized pole pieces, for establishing the deflecting magnetic field, which extend above the level of the target surface.

Vapor evolving from molten material in a crucible has a tendency to condense on the cooler surfaces of magnetic pole pieces positioned above the surface of the material. The loosely adhering condensate sometimes releases from its support and falls into the crucible or into the electron beam path. This causes evaporation instability due to the splattering of particles and droplets, and causes fluctuation of the evaporation rate by cooling of the pool due to the entry of the cooler material therein. On equipment designed for long production runs, the amount of condensate buildup on the pole pieces may be large enough to preclude the continuance of the evaporation cycle and necessitate premature cessation of the operation.

It is a principal object of the present invention to provide improved apparatus for producing and directing an electron beam.

Another object of the invention is to provide improved apparatus, for producing and directing an electron beam, which deflects the electron beam through a curving path of about 270° and converges the beam at a region subsequent to the curving path.

An additional object of the invention is to provide an improved electron beam gun assembly which is adapted to be positioned in a vacuum furnace to minimize contact of vapor particles with the electron emissive filament.

It is another object of the invention to provide improved apparatus for producing and directing an electron beam through a change in direction while providing focusing of the beam to impinge upon a target surface, and wherein no structural elements of the apparatus extend above the level of the target surface.

Other objects of the invention will become apparent to those skilled in the art from the following description taken in connection with the accompanying drawings wherein:

FIG. 1 is a perspective view of apparatus constructed in accordance with the invention and illustrating some of the lines of flux of the transverse magnetic field which deflect the electron beam;

FIGS. 4–7 are illustrations of the cross sectional shape of the electron beam at the various planes indicated by the lines 4—4, 5—5, 6—6, and 7—7, respectively, in FIG. 3;

FIG. 8 is a graph illustrating the field strength at various locations throughout the electron beam path; and FIG. 9 is a top view of an alternative embodiment of the invention.

Very generally, the apparatus of the invention includes means for producing an electron beam directed in an initial path and means for establishing a magnetic field transverse to the initial path for deflecting the electron beam through a curving path. The field establishing means are of a configuration to provide a field having a region, near the target surface, in which the field increases in strength in the plane of the curving path from the inner edge of the beam toward the outer edge. The field has an average strength near the target of about twice the average strength of the field near the middle of the beam path and has lines of flux near the target which are concave with respect to he target surface.

Figure 2:
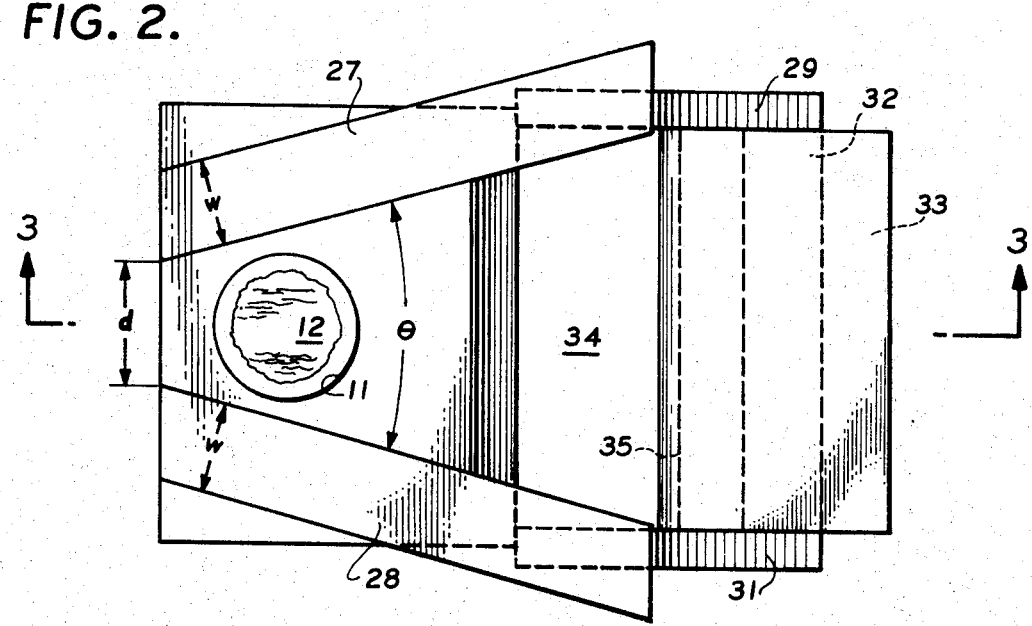
FIG. 2 is a top view of the apparatus.
Figure 3:
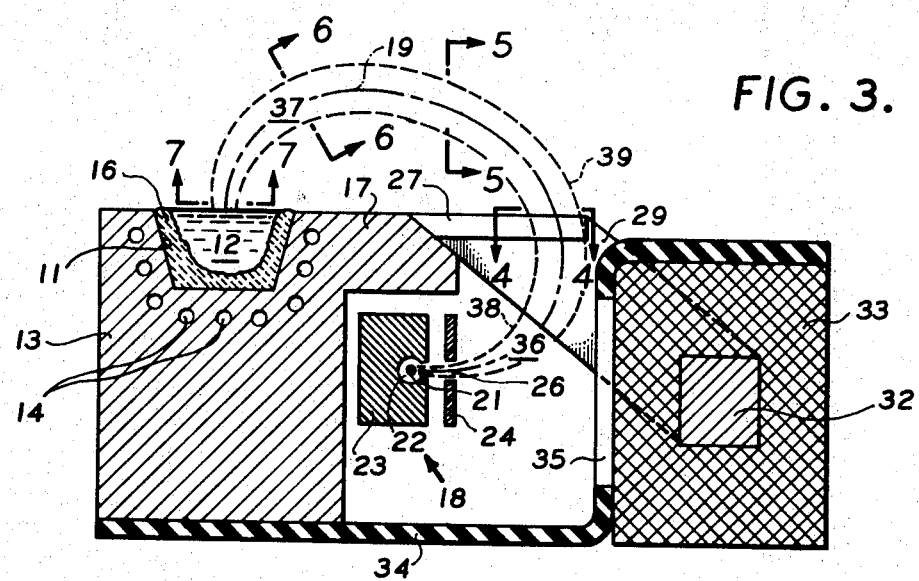
FIG. 3 is a sectional view taken along the line 3—3 of FIG. 2.

Referring now particularly to FIGS. 1 to 3, the apparatus illustrated therein will be described in detail. A crucible 11 for containing molten material 12 to be heated is formed in a solid block 13 of copper having passages 14 provided therein for carrying a flow of coolant through the block to cool the crucible. Suitable inlet and outlet pipes, not shown, may be provided for conducting coolant to the passages 14 and for removing coolant therefrom.

As will be explained, the material 12 is maintained in a molten condition by bombarding its surface with an electron beam. As a result of the cooling, a skull 16 of solidified material forms between the molten material and the cooled wall of the crucible. This prevents erosion of the crucible wall and reaction between the crucible material and the hot material in the molten pool. Thus, no contamination of the molten pool results and a substantially pure composition is maintained.

The block 13 includes a shelf 17 which extends outwardly of one side thereof at the top surface. An electron beam gun 18 is supported by suitable means, not illustrated, underneath the shelf 17 and is thus protected from splatter and similar particles thrown from the molten material 12. The electron beam gun 18 produces a high energy electrom beam, the axis of which is indicated by the dash-dot line 19. The electron gun includes an electron emissive filament or emitter 21 disposed within a reentrant opening or recess 22 in a backing electrode 23. An anode plate 24 is disposed adjacent the backing electrode 23 and has an opening 26 aligned with the emitter 21. Suitable means, not illustrated, provide a current for heating the emitter 21 to raise the temperature thereof to a level suitable for electron emission. Further suitable means are provided for maintaining the potential of the backing electrode 23 and the emitter 21 at a high negative potential with respect to the anode plate 24. Electrons produced by the emitter 21 are thereby accelerated outwardly of the backing electrode 23 and through the opening 26 in an initial path which is approximately perpendicular to the plate 24. Because the emitter 21 is elongated, a ribbon-shaped beam is produced extending generally perpendicularly of the filament and lying generally in a plane which is perpendicular to the plane of the paper as viewed in FIG. 3.

In accordance with the invention, means are provided for establishing a magnetic field transverse to the initial path of the beam for deflecting the electron beam through a curving path, such field establishing means having no structural elements protruding above the level of the liquid material 12 in the crucible 11. Moreover, the magnetic field thus established is capable of focusing the electron beam to substantial power densities, even with beam deflection through as much as a 270° change in direction. High power density is desirable in many circumstances for causing a desired evaporation rate or for producing exteme thermal gadients in the molten pool.

The magnetic field establishing means in the embodiment of FIGS. 1 through 3 comprise a pair of flat pole pieces 27 and 28 disposed on opposite sides of the crucible 11 and supported on a pair of yoke members 29 and 31, respectively. The yoke members and the pole pieces are comprised of a material having low magnetic reluctance. A core 32, also of a material having low magnetic reluctance, extends between the yoke members 29 and 31 in contact therewith and at the ends thereof opposite the pole pieces 27 and 28. An electromagnetic coil 33 is wound on the core 32 and suitable means, not illustrated, are connected to the coil 32 for energizing same and thus for producing a magnetic field extending between the pole pieces and the yoke members, as will be described subsequently.

The crucible block 13 and the coil 32 are supported by a support structure 34 having two offset horizontal sections and a vertical section joining them. The structure 34 is made of a material which affords structural rigidity to the assembly, various elements of the assembly being secured to the structure 34 by suitable means, not illustrated. An opening 35 is provided in the vertical section of the structure 34 to allow leakage flux from the coil 33 to supplement the flux established between the yoke members 29 and 31. The reason for this is explained below.

When the electromagnetic coil 33 is energized by passing a direct current therethrough, a magnetic field is established extending between the pole pieces 27 and 28 and the yoke members 29 and 31. This magnetic field has curving lines of flux in the fringe region 36 between the emitter 21 and the space between the yoke members 29 and 31, and in the fringe region 37 above the crucible 11.

As the electron beam leaves the emitter 21 it has a tendency to diverge due to the coaction of negatively charged electrons with each other. The curving lines of flux in the region 36, however, have a tendency to cause the electron beam to further converge in the direction parallel with the emitter. Moreover, since the electron beam as it leaves the emitter has not yet had time to spread to a large extent, the curving flux lines in the region 36 easily prevent the tendency for the beam to spread from having an adverse affect on operation of the apparatus. These fringe flux lines also begin deflecting the beam upwardly due to forces produced in accordance with the well-known right-hand rule. For proper deflection direction, the lines of flux extend upwardly out of the plane of the paper in FIG. 3. As hereinafter used, the beam deflection in degrees at any given point is determined by the angle between a tangent to the curving axis of the beam at the given point and a line through the given point parallel to the initial beam path as it leaves the emitter.

As the electron beam in the region 36 approaches the space between the yoke members 29 and 31, the magnetic field becomes stronger. This is due to the closer proximity of the yoke members and is also due to the closer proximity of the coil 33, which provides leakage flux extending adjacent the coil and parallel to the core 32 reinforcing the field in this region. Because of the leakage flux of the coil 33, the magnetic field in the region 36 increases in strength in the plane of the curving beam path (the plane of the paper in FIG. 3) from the inner edge 38 of the electron beam 19 to the outer edge 39 thereof. An increase in strength of between about 20% and 40% causes the electrons toward the outer edge of the beam to be deflected a sufficiently greater amount than those toward the inner edge that the electrons are focused from their initially divergent paths to a generally convergent path in the plane of the paper in FIG. 3. This condition exists for about the first 60° of change in beam direction.

After leaving the region 36, the beam enters the space between the yoke members 29 and 31. In this space, the magnetic field is substantially uniform. Since the electrons toward the outer edge of the curving beam are in the region longer, due to their greater path length, divergence of the beam is prevented and, depending upon physical proportions, some convergence may be produced. In the region between the pole pieces 27 and 28, the beam undergoes some tendency to diverge, since the field is stronger toward the inner edge of the beam due to the angular relationship of the pole pieces. This tendency has negligible affect, however, since the pole pieces are thin in the vertical dimension, and since the overall path length of the electrons toward the outer edge of the beam is greater.

In order to prevent divergence of the opposite edges of the beam (as illustrated by the dotted lines 38 and 39 in FIG. 3) once the beam rises above the level of the pole pieces 27 and 28, the apparatus is designed such that the fringe region of the magnetic field above the level of the pole pieces decays only a negligible amount with distance from the pole pieces in the region through which the beam passes. Once the beam rises above the level of the pole pieces 27 and 28, the fringe field established between the pole pieces produces transverse deflection of the electron beam through about 180° to the target surface. In order to minimize the field gradient above the magnetic pole pieces 27 and 28, the pole pieces are made at least as wide (in the horizontal direction) as their thickness (in the vertical direction). This provides at least as great a surface for flux leakage at the top of the pole pieces as compared with their facing sides, and aids in strengthening and improving the fringe field above the pole pieces. For example, a pole piece separation of about 1½ inches at their closest point (indicated by the distance $d$ in FIG. 2) may be utilized with pole pieces ¼ inch thick and about 1¼ inches wide (the dimensions $w$ in FIG. 2) diverging at about 45° to produce about 10 percent greater flux density in the first two inches above the poles than is attainable with half inch wide pole pieces with the same gap.

In order to achieve the final deflection of the beam down onto the surface of the molten material 12, the field in the region of the crucible is made of increasing strength from the inner edge 38 of the beam toward the outer edge 39. As may be seen in FIG. 2, this is done by mounting the pole pieces 27 and 28 to converge toward the crucible 11 from the ends of the pole pieces adjacent the coil 33. Not only does this provide the aforementioned field gradient, but the field above the crucible in the region 37 averages about twice the strength of the field in the region where the beam first rises above the level of the pole pieces 27 and 28. The field strength in the region where the beam rises above the pole pieces is of a value to impart a reasonably high arch to the beam. This allows the beam to be brought down onto the target fairly steeply, so that the impact pattern is not spread out too much. A satisfactory strength in this region may be about 125 to 135 gausses for a 10 kw. beam. Thus, for example, a field strength average of about 270 gausses may be produced just above the center of the crucible.

In addition to deflecting the beam, the field above the crucible also produces a final convergence or focusing effect. Because of the extreme width of the pole pieces relative to their thickness, and because of the angled position of the pole pieces, the beam passes through a region just above the crucible in which the field strength increases in the plane of the curving path from the inner edge of the beam toward the outer edge. Since the electrons toward the outer edge 39 of the beam 19 pass through stronger portions of the field and have longer travel in the field than those electrons toward the inner edge 38 of the beam, further convergence results. Preferably, the increase in field strength from inner edge to outer edge is between about 20% and about 40%. In addition, because the lines of force above the crucible are concave with respect to the pool surface (i.e., arch over the top of the crucible), focusing in the direction parallel with the emitter (perpendicular to the paper in FIG. 3) occurs throughout the fringes of the field above the pole pieces, resulting in a convergence of the beam into a substantially round spot. The arching lines of force above the crucible are indicated at 41 in FIG. 1.

The establishment of the proper magnetic field gradients and curvature of the lines of force in the fringes of the field above the pole pieces 27 and 28 is accomplished by appropriate choice of spacing between the poles for a given radius of curvature of the electron beam path, and by proper selection of the poles widths in relation to their thicknesses. The wider the poles, the less rapidly the field intensity changes for a given distance along the vertical plane midway between the pole pieces. The wider the pole spacing, the less the bow to the magnetic flux lines. Thus, for a given required radius of curvature in a particular form of apparatus, appropriate pole piece widths and spacing may be selected empirically. Satisfactory results in many instances may be achieved with a ratio of the width of each pole piece ($w$) to the width of the smallest gap therebetween ($d$) of between about 0.25 and about 1.5.

Referring to FIGS. 4 through 7, typical beam cross sections, as determined by appropriate placement of sheets of metallic foil, are shown at various positions. In the plane 4—4, with the beam emerging into the region above the pole pieces, the beam is of substantial cross sectional area. FIG. 5—5 shows a slight focusing effect with this effect continuing at the plane 6—6 until, in the plane of the surface of the molten pool 12, shown in FIG. 7, the beam cross section is narrowed to the desired spot (for example, one inch or less in diameter).

If the angle $\theta$ is varied from 45° to 60°, the lateral focusing or focusing in the direction lying in the plane of the paper in FIG. 2, occurs before the radial focusing and, consequently, a relatively larger spot than that shown in FIG. 7 is obtained. Thus, there may be a nodal point or point of minimum cross section in the plane 6—6 insofar as the lateral focusing is concerned, and the beam will be diverging by the time it reaches the plane 7—7. If the angle $\theta$ is changed to about 30° by increasing the dimension $d$, the beam spot is moved toward the left in FIG. 2.

Referring now to FIG. 8, a graph is shown illustrative of a field having satisfactory field gradients for causing about 270° deflection of a 10-kilowatt electron beam to a spot contained within the periphery of a 1 inch diameter surface located a distance of 1⅛ inches in back of the emitter at a level 1 inch higher than the emitter. The angle of the poles ($\theta$ on FIG. 2) is 45°, the distance $w$ equal to 1 inch, and the pole piece thickness ¼ inch. The distance $d$ is 11/16 inch and the distance between the yoke members 29 and 31 is 3 inches. In order to establish the field strengths shown, the magnetic induction of the coil 33 is 1700 ampere turns. The magnetic induction at the apex or closest point between the pole pieces is about 400 gausses. It will be seen that the inverse field gradients between inner and outer edges of the electron beam are present during about the first 60° of beam deflection and during about the last 30° of beam deflection. During the remaining portion of the beam's travel, the gradient is slightly in the opposite directon but insufficient to detrimentally affect the focusing.

A satisfactory system for providing a generally round spot of about 3 inches in diameter for a 10 kilowatt beam is illustrated in FIG. 9. Parts in FIG. 9 having functions similar to corresponding parts in FIGS. 1 through 3 have been given identical reference numerals preceded by a 1. The pole pieces 127 and 128 are generally parallel from adjacent the coil 133 up to the region near the crucible 111. At this point, the pole pieces are angled inwardly at an angle $\theta$ of about 60°. Using poles ½ inch x ½ inch separated by a gap $d$ of about 2 inches and separated by a gap of about 3½ inches between the parallel sections of the pole pieces, satisfactory focusing may be achieved using a coil 133 having a magnetic induction of 1,450 ampere turns. The field strength at the closest point between the pole pieces 127 and 128 reaches about 130 gausses. The field strength at the center line of the crucible is approximately 100 gausses and the field strength between the parallel sections of the pole pieces is approximately 126 gausses. The inverse gradients above the crucible and near the emitter vary in about the same proportion as in the previous embodiment.

It may therefore be seen that the invention provides improved apparatus for producing and directing an electron beam through a curving path to a target surface. No structure need be placed above the level of the target surface and effective convergence of the beam is readily attainable to a desired spot size. Although described herein in connection with deflection of about 270° (for which the invention is particularly useful), the invention is applicable to deflections of greater or lesser magnitude. Thus, in accordance with the invention, a sharp change in beam direction and a sharp beam focus are produced just above a target surface without utilizing pole pieces which project above such surface.

Various modifications of the invention in addition to those shown and described herein will become apparent to those skilled in the art from the foregoing description and accompanying drawings. Such modifications are intended to fall within the scope of the appended claims.

What is claimed is:

1. Apparatus for producing and directing an electron beam through a curving path to a target surface, comprising, means for producing an electron beam directed in an initial path, and means for establishing a magnetic field transverse to the initial path for deflecting the electron beam through the curving path, said field establishing means including a pair of pole pieces positioned on opposite sides of the plane of the curving beam path and of the target surface and substantially at or below the level of the target surface, said pole pieces being disposed at an angle with respect to each other opening in a direction to provide a field with a region near the target surface in which the field increases in strength in the plane of the curving path from the inner edge of the beam toward the outer edge, said pole pieces having top surfaces of a width at least equal to the heights of said pole pieces at their inner edges to produce lines of flux which are concave with respect to the target surface.

2. Apparatus according to claim 1 wherein said field establishing means include a pair of yoke members extending downwardly from said pole pieces, respectively, on opposite sides of a region in front of and spaced from said beam producing means, and further include an energizing coil joining the lower ends of said yoke members to provide the field with a further region, near said beam producing means, in which the field increases in strength in the plane of the curving path from the inner edge of the beam toward the outer edge.

3. Apparatus according to claim 2 wherein said yoke members are positioned so that the increase in field strength between the inner and outer edges of the beam at each region is between about 20% and about 40%.

4. Apparatus according to claim 2 wherein the total change in direction of the beam is about 270°, and wherein the regions of strength increase toward the outer edge of the beam comprise about the first 60° of beam deflection and about the last 30° of beam deflection.

5. Apparatus according to claim 3 wherein the remainder of the transverse magnetic field in the region between about 30° to about 240° of beam deflection decreases in strength in the plane of the curving path from the inner edge of the beam toward the outer edge.

6. Apparatus according to claim 1 wherein said pole pieces are positioned below the target surface.

7. Apparatus according to claim 2 wherein said coil is positioned adjacent the electron beam path such that leakage flux from said coil reinforces the flux extending between said yoke members.

8. Apparatus according to claim 1 wherein the inner edges of the pole pieces converge toward the target in the plane of the target surface at an included angle between about 40° and about 60°.

9. Apparatus according to claim 8 wherein the ratio of the width of each pole piece to the width of the smallest gap therebetween is between about 0.25 and about 1.5.

10. Apparatus according to claim 1 wherein the curving beam path changes beam direction through about 270°, and wherein the angle between said pole pieces is such that the field has an average strength near the target about twice the average strength of the field in the region near the middle of the beam path.

11. Apparatus for producing and directing an electron beam through a curving path to a target surface, comprising, means for producing an electron beam directed in an initial path, and means for establishing a magnetic field transverse to the initial path for deflecting the electron beam through the curving path, said field establishing means including a pair of pole pieces spaced on opposite sides of the curving beam path and means forming a low reluctance electromagnetic flux circuit between said pole pieces, said field establishing means including a coil having a flux circuit, said coil being positioned adjacent the electron beam path a distance therefrom such that the leakage flux from said coil crossing the curving beam increases in strength, from the inner edge of the beam to the outer edge thereof, between about 20% and about 40%.

References Cited

UNITED STATES PATENTS

| | | | |
|---|---|---|---|
| 2,909,688 | 10/1959 | Archard | 335—210 X |
| 2,952,791 | 9/1960 | Wideroe | 335—210 X |
| 2,955,220 | 10/1960 | Snyder | 335—210 |
| 3,021,445 | 2/1962 | Wideroe et al. | 335—210 X |
| 3,005,859 | 10/1961 | Candidus | 13—31 |
| 3,243,667 | 3/1966 | Enge | 335—210 |
| 3,189,953 | 6/1965 | Smith | 13—9 X |
| 3,409,729 | 11/1968 | Hanks | 13—9 X |
| 3,394,217 | 7/1968 | Fisk | 335—210 X |

GEORGE HARRIS, Primary Examiner

R. N. ENVALL, JR., Assistant Examiner

U.S. Cl. X.R.

335—210